Aug. 20, 1957     J. C. NEW     2,803,135
FIXED DEPTH PRESSURE DETECTOR OR INDICATOR
Filed Sept. 12, 1955     2 Sheets-Sheet 1
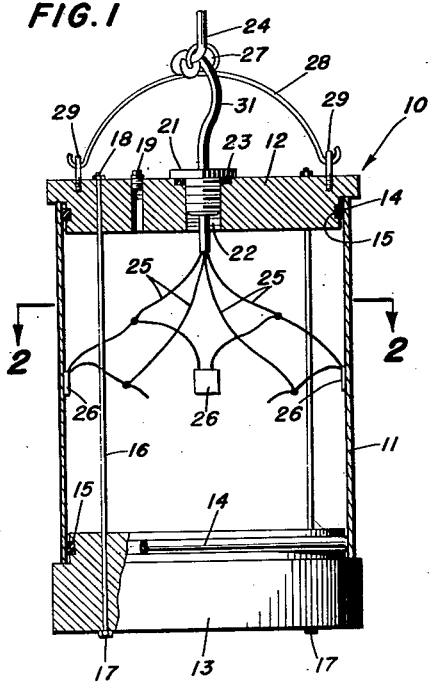
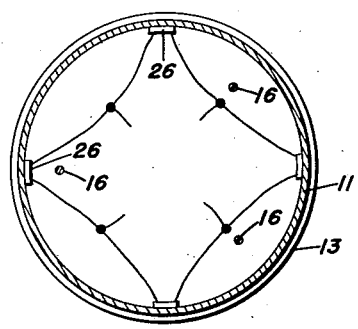
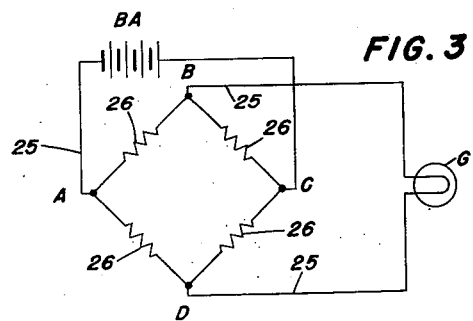
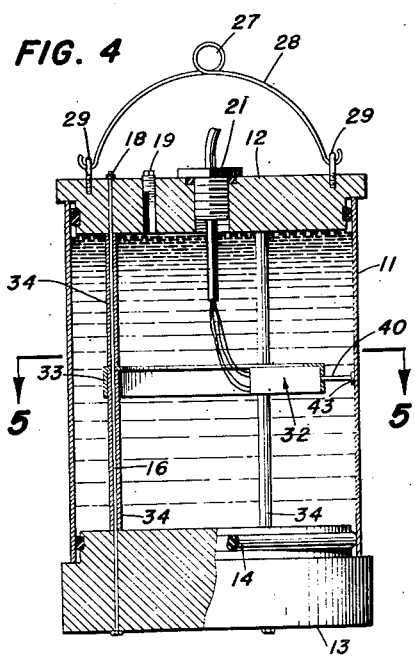
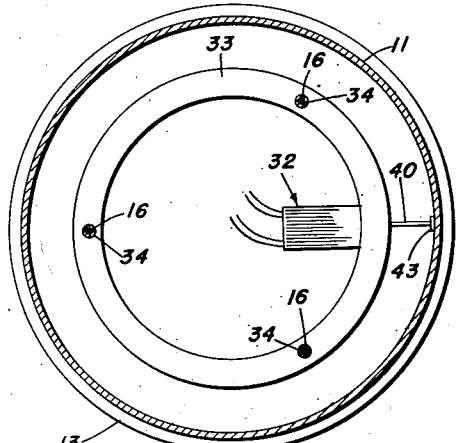
INVENTOR
J. C. NEW
BY
ATTORNEYS Aug. 20, 1957 J. C. NEW 2,803,135
FIXED DEPTH PRESSURE DETECTOR OR INDICATOR
Filed Sept. 12, 1955 2 Sheets-Sheet 2

VOLTAGE DUE TO DEFLECTION

INVENTOR
J. C. NEW

BY
ATTORNEYS

United States Patent Office 2,803,135
Patented Aug. 20, 1957

2,803,135

FIXED DEPTH PRESSURE DETECTOR OR INDICATOR

John C. New, Riverdale, Md., assignor to the United States of America as represented by the Secretary of the Navy Application September 12, 1955, Serial No. 533,924

9 Claims. (Cl. 73—300)

(Granted under Title 35, U. S. Code (1952), sec. 266)

The invention described herein may be manufactured and used by or for the Government of the United States of America for governmental purposes without the payment of any royalties thereon or therefor.

The present invention relates to a detector and more particularly to a new and improved depth measuring detector for detecting small pressure changes in the presence of a predetermined relatively large background pressure. Moreover the invention relates to a device comprising a sealed thin shell constructed of any suitable material compatible with fluid in which it is to be used, and of such geometry and proportions that it will buckle by elastic instability at a fixed hydrostatic depth and in which means carried by the shell and connected to a suitable meter or electrical recording device measures the depth in response to a deflection of the wall of the shell as the shell starts to buckle.

It will be understood, however, that the shell is filled with a compressible liquid having a high bulk modulus such, for example, as water, oil or the like to prevent the shell from collapsing permanently and the measuring means are secured to the shell in such a manner that they are rendered effective in response to the incipient buckling of the shell.

An object of the present invention is to provide a new and improved pressure responsive device suitable for detecting small pressure changes in the presence of a relatively large predetermined background pressure.

Another object of the invention is the provision of a pressure responsive device having a thin shell which will start to buckle by elastic instability at a fixed hydrostatic pressure and which includes new and improved means for detecting minute pressure changes in the presence of large background pressures.

Still another object of the invention is the provision of a pressure detector having a sealed thin shell filled with a compressible liquid wherein new and improved means are provided for detecting and indicating a minute increase in a large background pressure in response to a deflection of the wall of the shell as the shell buckles.

A still further object of the invention is the provision of a sealed thin liquid filled shell wherein new and improved means are provided for indicating and measuring the deflection of the shell as the shell is deformed due to elastic instability at a pressure applied externally thereto corresponding to a fixed hydrostatic depth of submersion.

Other objects and many of the attendant advantages of this invention will be readily appreciated as the same becomes better understood by reference to the following detailed description when considered in connection with the accompanying drawings wherein:

Fig. 1 is a central longitudinal sectional view of the device constructed in accordance with a preferred embodiment of the present invention;

Fig. 2 is a sectional view taken on the line 2—2 of Fig. 1;

Fig. 3 illustrates a circuit arrangement suitable for use with the device of Fig. 1;

Fig. 4 is a central longitudinal sectional view of an alternate arrangement of the device of Fig. 1;

Fig. 5 is an enlarged sectional view taken on the line 5—5 of Fig. 4;

Figure 6:
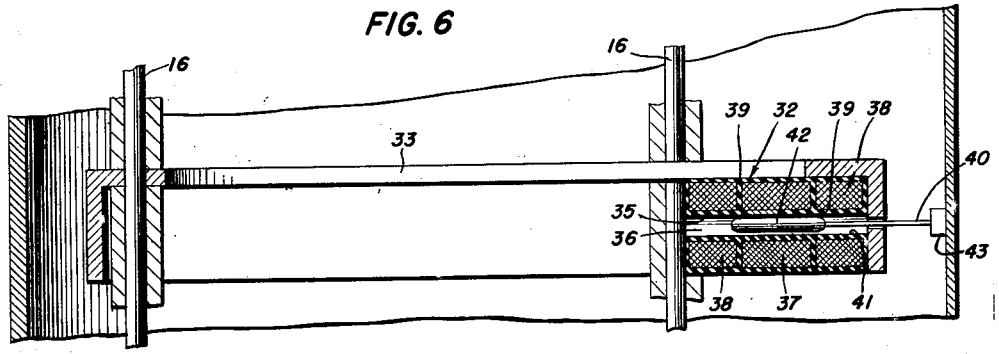
Fig. 6 is an enlarged fragmentary sectional view of Fig. 4, illustrating the linear variable differential transformer in section and the support therefor.

Referring now to the drawings wherein like numerals designate corresponding parts throughout the several views and more particularly to Fig. 1, the device of the present invention is generally indicated by the numeral 10. The device comprises a thin cylindrical shell 11 composed of any material suitable for the purpose such, for example, as steel or the like and disposed between a pair of strong rigid closures 12—13. Each of the closures carries O-rings 14 disposed in grooves 15 formed in the member 12—13 respectively in sealing engagement therewith and with the shell 11. The shell 11 is completely filled with a compressible fluid having a high bulk modulus such, for example, as water.

As more clearly shown on Fig. 1 the closures 12—13 are maintained in sealing engagement with the shell 11 by stay bolts 16 extending through the closures and having a head 17 formed on one end thereof in engagement with closure 13 and a nut 18 threaded on the other end thereof in engagement with closure 12. The closure 12 is provided with a filler opening closed by a plug 19 in threaded engagement with the opening. A packing gland 21 is threaded into a bore 22 formed in member 12 in engagement with an O-type packing ring 23, the gland having sealed therein a cable 24 which carries a plurality of conductors 25. It will be understood that the cable 24 may be connected to a source of power such as the battery BA, Fig. 3, and to a suitable meter or recording device such, for example, as a galvanometer to provide a visual indication of the wall deflection of the shell as the shell buckles.

It will be noted on Fig. 1 that each of the conductors extends into the interior of the shell 11 and is connected to a pair of strain gages 26, Figs. 1 and 3, the gages being oppositely disposed about the interior of the shell 11. The aforesaid gages are enclosed within a waterproof casing and secured to the inner surface of the shell in any suitable manner such that the gages are rendered effective as the shell buckles in response to hydrostatic pressure when the device sinks to a predetermined depth within a body of water or a pressure corresponding to such depth of submersion is applied exteriorly thereto, as the case may be.

The device may be lowered into the body of water by the cable 24 looped about an eye 27 formed on the bale 28, the bale being secured to the cover 12 as at 29. By this arrangement sufficient slack is provided in the cable as at 31 to prevent extraneous strain on that portion of the cable between the bale and the packing gland as the device is lowered into the water. It will be noted that the member 13 is of sufficient weight to cause the device to sink within the water as the device is launched therein.

Referring now to Fig. 3 there is illustrated a circuit arrangement suitable for use with the device of Fig. 1 and utilizing a strain gage bridge including the strain gages 26 and conductors 25. The bridge comprises four arms A-B, B-C, C-D, D-A each having one of the strain gage elements 26 connected in series. A source of potential BA is connected across the bridge at the junctions A-C for supplying the operating bridge potential. The output of the bridge is taken from junctions B-D and applied to the input of a galvanometer G. It will be understood that when forces are exerted on the strain elements 26 in response to buckling of the shell, the bridge is rapidly unbalanced due to variations in the degree of buckling of different portions of the shell causing the resistive values of the strain elements to be varied unequally. This unbalance of the bridge in response to buckling of the shell is made manifest on galvanometer G as an indication that the pressure surrounding the shell is at a predetermined value.

In the arrangement of Fig. 4 a linear variable differential transformer generally indicated by the numeral 32 is employed in lieu of the stain gage arrangement of Fig. 1. The transformer is supported within the shell by an annular member 33 arranged on the stay bolts 16 and disposed between a pair of spacers 34 and carried thereby whereupon the transformer is supported substantially midway between the closure members 12 and 13. The transformer is constructed and arranged to generate an output voltage controlled by mechanical movement of one of its elements from an initial position of balance.

As more clearly shown on Fig. 6 the transformer comprises an insulating sleeve 35 having an axial bore 36 extending therethrough. The sleeve 35 carries a centrally disposed primary winding 37 and a pair of secondary coils 38 disposed on opposite ends of the primary winding respectively, the aforesaid coils being separated by suitable insulating members 39 and from the ring 33 and stay bolt 11 by insulating members 41. Disposed within the bore 36 is a movable core 42 composed of any material suitable for the purpose such, for example, as steel and having a rod 40 composed of brass carried thereby and secured to the shell as at 43. The coils 37 and 38 are enclosed in a waterproof casing 44. In the aforesaid arrangement it will be understood that the primary or center coil is coupled electro-magnetically with each of the two secondary or outer coils. Moreover, the secondary coils are connected in series opposition, such that for a certain position of the core the voltage induced in each secondary coil is substantially the same in magnitude but opposite in phase. The difference between these induced output voltages, which is the net output, is very low when the core is in the initial balanced position and its value is referred to herein as the voltage at the minimum balance point. When the core is moved from this minimum balance point the voltage induced in the coil toward which the core is moved increases while the voltage induced in the opposite coil decreases. The net voltage is of larger value than the voltage at the minimum balance point. Thus by this arrangement the linear differential transformer is well adapted to measure the side wall deflection of the shell as the shell buckles in response to hydrostatic pressure.

As the device is subjected to gradually increasing hydrostatic pressure, the circular wall of the shell is deflected only a very small distance until the incipient buckling pressure is reached since the action is elastic up to this point. Beyond this point, however, the deflection by comparison is several orders of magnitude greater for the reason that the shell is attempting to buckle from elastic instability, but is restrained from completely collapsing by the enclosed liquid. Upon incipient buckling of the shell the aforesaid transformer is rendered effective whereupon the wall deflection of the shell and the external pressure applied thereto may be made manifest.

Figure 7:
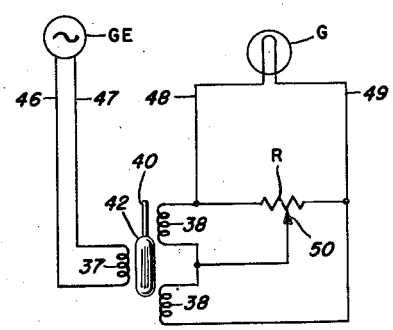
Fig. 7 is a circuit arrangement suitable for use with the device of Fig. 4.

For a more complete understanding of the operation of the device of Fig. 4, attention is directed to the circuit arrangement of Fig. 7 wherein GE indicates an A. C. source of potential connected to the primary coil 37 by conductors 46–47 with the secondary coils 38 oppositely connected and the output thereof connected to galvanometer G by conductors 48–49. A resistor is connected across the output of the coils 38 and is provided with a movable contactor 50 connected to the conductor intermediate the coils 38 whereby the voltage of each of the coils may be adjusted to equality and thus obtain a minimum output voltage when the core 42 is positioned at the minimum balance point as heretofore set fore. Thus by this arrangement it will be understood that when the shell buckles, the core 42 moves proportionally thereto and an increase of voltage is induced in the coil 38 toward which the core moves while a decrease in the voltage occurs in the coil from which the core is moved. When this occurs the galvanometer is actuated by the output voltage and thus the deflection of the shell may be made manifest by the reading of the galvanometer.

Figure 8:
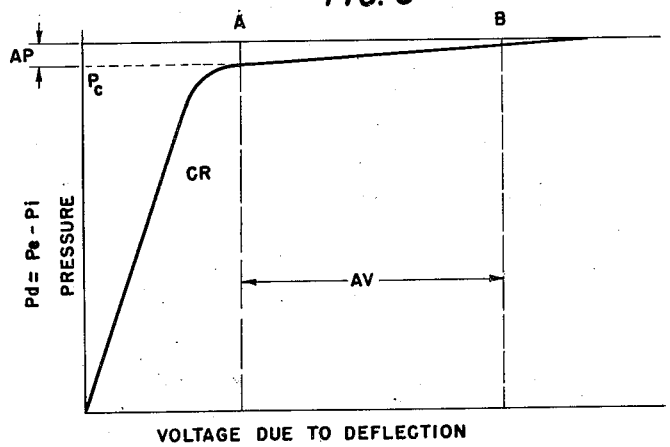
Fig. 8 is a diagram of the wall deflection curve.

Fig. 8 illustrates in graphical form a pressure curve and the voltage developed by the transformer as the shell is subjected to an increase in hydrostatic pressure. It will be noted on curve CR that as the device is subjected to gradually increasing hydrostatic pressure, the cylindrical wall of the shell will deflect only a small amount until the incipient buckling pressure is reached at point Pc, since the action of the shell is elastic up to this point. Between points Pc and Ap, however, the shell deflection is of greater magnitude since the shell is attempting to buckle from elastic instability, but is prevented from collapsing completely by reason of the liquid contained therein. Thus, the differential transformer registers this magnitude of deflection as a greater signal output as indicated between points A-B on the aforesaid curve.

Figure 9:
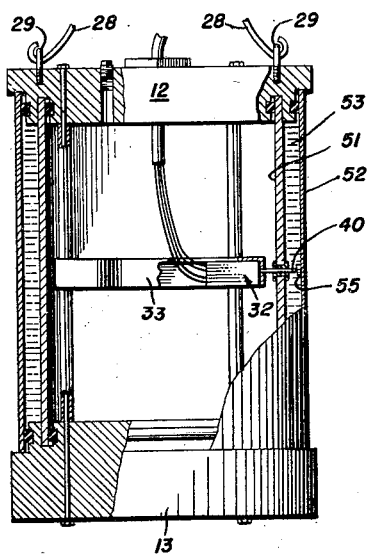
Fig. 9 is a central longitudinal view of another arrangement of the device of Fig. 4.

The arrangement illustrated in Fig. 9 is somewhat similar to the device of Fig. 4, however, in this arrangement the device comprises an inner cylindrical member 51 composed of relatively thick material and sealed to the closures 12–13. An outer cylindrical shell 52 composed of relatively thin material is disposed about the member 51 in spaced relation with respect thereto to provide a chamber 53 between member 51 and shell 52, the shell being in sealing engagement with the closures 12–13. The chamber 53 is filled with a compressible liquid having a high bulk modulus such, for example, as water, oil or the like to prevent the shell from collapsing permanently.

In this arrangement, however, the transformer 32 is supported within the member 51 in a manner similar to the arrangement illustrated in Fig. 4. The rod 40 in this arrangement extends through an opening 54 formed in the member 51 and is secured to the outer thin shell as at 55 and the member 51 is provided with a gasket in sealing engagement with the rod 40 thereby to prevent the fluid in chamber 53 from entering the interior of member 51.

In the device of Fig. 9 it will be understood that the circuit arrangement of Fig. 7 may be employed therewith and thus upon incipient buckling of the outer shell 52 the transformer is rendered effective whereby the deflection of the shell 52 may be made manifest by the reading of the galvanometer as the galvanometer is actuated by the output voltage of the transformer.

By employing the aforesaid liquid filled shells in the manner set forth, the shell under test is preserved for further use since the liquid prevents the shell from collapsing or buckling permanently. The buckling or collapsing of a thin shell is an indication of lack of equilibrium between the externally applied pressure and the stress developed in the shell wall. When the stress is substantially below the elastic limit, the failure is characterized as being due to elastic instability. When the stress at the time of buckling is in the inelastic range of the material it is characterized as a failure by yielding. In either case, a state of unstable equilibrium exists causing an uncontrolled reaction to take place, namely, a nearly explosive collapse of the shell.

Since the rigidity of the shell per se is inadequate to maintain equilibrium, an additional force must be introduced to prevent sudden collapse of the shell or to control the rate of collapse thereof. If the aforesaid force is related to the external force through the rigidity of the shell, then at the point of buckling of the shell a balance between the internal and external forces must exist such that for each increase in external load an equal and opposite increase is developed by the restoring or internal force, thus maintaining equilibrium between the forces.

Thus, it is apparent that if a closed shell subjected to external pressure is filled with a compressible liquid as heretofore set forth, the point at which buckling of the shell begins may be detected by observing the point at which the difference between the external and internal pressure becomes constant. When the device is subjected to gradually increasing hydrostatic pressure, the cylindrical wall of the shell will deflect only a very small distance until the incipient buckling pressure is reached, since the action is elastic up to this point. Beyond this point, however, the deflection is much greater in magnitude, since the shell is now attempting to buckle from elastic instability, but is prevented from completely collapsing by reason of the compressible liquid contained therein. The differential transformer detects this greater deflection as a greater signal output as the transformer is rendered effective by movement of the core secured to the shell whereupon the device is capable of detecting small pressure changes in the presence of large background pressures.

From the foregoing it will be understood that the present invention provides a detector having new and improved means for detecting and measuring small pressure changes at a fixed depth of submersion which comprises measuring and indicating the deflection of a thin shell as the shell buckles due to elastic instability in response to pressure applied externally thereto and corresponding to a fixed hydrostatic depth of immersion of the shell.

Whereas in Figs. 1 and 2 there is disclosed an arrangement comprising a plurality of strain gages 26 secured interiorly to the shell 11, it will be understood that the invention is not so limited as the strain gages, if desired, may be secured exteriorly to the shell or both exteriorly and interiorly in paired combination, as the case may be.

Furthermore, it will be understood that whereas the transformer arrangement of Figs. 4 and 9 causes, as shown on Fig. 8, a slight voltage increase as the external pressure is brought up to the predetermined value Pc, the voltage output of the balanced bridge of Fig. 3 remains substantially at the initial balanced value until the incipient buckling pressure is reached by reason of substantially equal changes in each of the strain gages 26 in response to the increase in hydrostatic pressure.

The property of compressibility of water is known and has been set forth authoritatively in literature such, for example, as a book entitled "Hydraulics" by Horace M. King, Chester O. Weisler and James G. Woodburn, fourth edition, New York, published by John Wiley and Son, Inc., London; Chapman and Hall, Limited, 1941, page 9, paragraph entitled, "Compressibility," the first three sentences of which are quoted herewith; "Water is commonly assumed to be incompressible, but in reality it is slightly compressible. Upon release from pressure, water immediately regains its original volume. For ordinary pressures the modulus of elasticity is constant, that is, the amount of compression is directly proportional to the pressure applied."

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A sensitive pressure detector of the character described comprising a thin wall cylindrical sealed shell, a compressible liquid contained therein and completely filling said shell, means disposed within the shell midway between the ends thereof and rendered effective by incipient buckling of the shell at a predetermined pressure as the shell is subjected to gradually increasing hydrostatic pressure applied exteriorly thereof for producing a voltage proportional to the deflection of said shell, and means connected to said voltage producing means and controlled thereby for providing a visual indication of said predetermined pressure as said voltage producing means is rendered effective.

2. A sensitive pressure detector of the character described comprising a thin wall cylindrical sealed shell, a compressible liquid contained therein and completely filling said shell, means disposed within and secured to said shell midway between the ends thereof and rendered effective by incipent buckling of the shell at a predetermined pressure as the shell is subjected to gradually increasing hydrostatic pressure applied exteriorly thereto for producing a voltage proportional to the deflection of said shell, and an indicator including an electrical circuit connected to said voltage producing means for providing a visual indication of said predetermined pressure as said voltage producing means is rendered effective.

3. A sensitive pressure detector of the character described comprising a thin wall cylindrical sealed shell, a compressible liquid contained therein and completely filling said shell for preventing complete collapse of the shell at a predetermined pressure as the shell is subjected to gradually increasing hydrostatic pressure applied externally thereto, means secured to said shell midway between the ends thereof and rendered effective in response to incipient buckling of the shell by an increase of hydrostatic pressure for producing a voltage proportional to the deflection of the shell, and an indicating device including a bridge circuit connected to said voltage producing means for providing a visual indication of said predetermined pressure as said voltage producing means is rendered effective.

4. A device for measuring the deflection of a thin wall liquid-filled cylindrical shell and comprising means including a voltage controlling device secured to said shell midway between the ends thereof and movable proportional to the deflection of the shell as the shell buckles in response to an increase in hydrostatic pressure applied exteriorly thereto, an electrical circuit connected to said device, and means including an indicator in said circuit and actuated by said device for providing a visual indication of said deflection.

5. A device for measuring the deflection of a thin wall liquid-filled shell and comprising a linear variable differential transformer supported within said shell, an armature secured to said shell substantially midway between the ends thereof and movable within said transformer for inducing a voltage in said transformer as the armature is moved in response to the buckling of the shell by an increase of hydrostatic pressure applied externally thereto, and means including an indicator connected to said transformer and actuated thereby for providing a visual indication whereby the deflection of the shell is made manifest by the reading of said indicator.

6. A device according to claim 5 in which said shell is cylindrical in configuration.

7. A device for measuring the deflection of a thin wall liquid-filled cylindrical shell and comprising a linear variable differential transformer supported within said shell and having a primary winding and a pair of secondary windings, said primary winding being adapted to be energized to develop an induced voltage in said secondary windings, an electrical energizing source for said primary winding, an armature disposed within said transformer and secured to said shell midway between the ends thereof and movable thereby as the shell is deflected in response to an increase of hydrostatic pressure applied externally thereto for causing a variation in said voltage, an output circuit connected to said secondary windings, and an indicating device included in said circuit and responsive to the induced voltage of said secondary coils for providing a visual indication whereby the deflection of the shell may be made manifest.

8. A sensitive pressure detector of the character described comprising a thin wall shell midway between the ends thereof, a compressible liquid completely filling said shell, a pair of rigid closures sealed to and disposed on opposite ends of said shell and of sufficient mass to cause said detector to sink as the detector is launched into a body of water, an annular ring arranged within said shell and supported by said closures, a linear variable differential transformer fixedly supported on said ring and comprising a primary winding and a pair of opposedly connected secondary windings sealed from said liquid, an armature secured to the shell and movable within said transformer for inducing a voltage in said secondary windings as the armature is moved from an initial position of balance in response to buckling of the shell at a predetermined pressure by an increase of hydrostatic pressure applied externally thereto, and means including an indicator connected to said transformer and responsive to the voltage output thereof for producing a visual indication of said pressure increase.

9. A device of the character disclosed for detecting a predetermined hydrostatic pressure of the fluid within which the device is immersed, comprising a thin wall liquid-filled cylindrical shell having a plurality of oppositely arranged strain gages disposed about the shell and secured thereto midway between the ends thereof, an initially balanced Wheatstone bridge, each of the arms of said bridge having one of said strain gages connected therein, a source of potential connected across the bridge, an output circuit connected across said bridge, and a galvanometer connected to said output circuit and responsive to the unbalance of said bridge caused by variations in the resistance of said gages as the gages are rendered effective in response to buckling of said shell at said predetermined pressure.

References Cited in the file of this patent

UNITED STATES PATENTS

| | | |
|---|---|---|
| 2,148,013 | Carlson | Feb. 21, 1939 |
| 2,336,500 | Osterberg | Dec. 14, 1943 |
| 2,361,738 | Bird | Oct. 31, 1944 |
| 2,391,966 | Harrison | Jan. 1, 1946 |
| 2,420,148 | Ostergraen | May 6, 1947 |
| 2,627,183 | Greenwood et al. | Feb. 3, 1953 |
| 2,752,558 | Kane | June 26, 1956 |